US 6,556,766 B2

(12) United States Patent
Cheung et al.

(10) Patent No.: US 6,556,766 B2
(45) Date of Patent: Apr. 29, 2003

(54) MEMS SEE-SAW ARRAY FOR DYNAMIC GAIN EQUALIZATION OF DWDM SYSTEMS

(75) Inventors: Eric Chiu Tat Cheung, Torrance, CA (US); Christopher Lin, Richmond, CA (US); Yongsheng Liu, San Jose, CA (US); Xuefeng Yue, Mt. View, CA (US)

(73) Assignee: Avanex Corporation, Fremont, CA (US)

( * ) Notice: Subject to any disclaimer, the term of this patent is extended or adjusted under 35 U.S.C. 154(b) by 109 days.

(21) Appl. No.: 09/893,195

(22) Filed: Jun. 26, 2001

(65) Prior Publication Data

US 2002/0197009 A1 Dec. 26, 2002

(51) Int. Cl.[7] ................................................. G02B 6/00
(52) U.S. Cl. ........................ 385/140; 385/31; 385/18; 385/37
(58) Field of Search ........................... 385/140, 16, 17, 385/18, 31

(56) References Cited

U.S. PATENT DOCUMENTS 5,345,521 A * 9/1994 McDonald et al. ............ 385/19
6,275,320 B1 * 8/2001 Dhuler et al. ................ 359/237

OTHER PUBLICATIONS

Tunable VCSEL, Connie J. Chang–Hasnain, IEEE Journal on Selected Topics In Quantum Electronics, vol. 6, No. 6, Nov./Dec. 2000.

* cited by examiner

*Primary Examiner*—Brian Healy
*Assistant Examiner*—Kevin S. Wood
(74) *Attorney, Agent, or Firm*—Sawyer Law Group LLP

(57) ABSTRACT

A dynamic gain equalizer (DGE) includes: a mirror; an electrode; and a lever with a first end and a second end opposite to the first end, where the lever is capable of rotating about a fulcrum, where the lever rotates the first end toward the electrode when the electrode is charged such that the second end blocks a portion of a channel from reaching the mirror, where an unblocked portion of the channel is reflected by the mirror. By manipulating the charge on the electrode, the rotation of the lever is controlled, determining how much of the light is blocked by the lever. Each lever in an array can attenuate a channel or a group of channels of a composite optical signal by a different amount. The DGE provides a significant range of blockage and can be closely spaced. It provides ease in integrating channel monitoring into the DGE.

15 Claims, 5 Drawing Sheets

MEMS SEE-SAW ARRAY FOR DYNAMIC GAIN EQUALIZATION OF DWDM SYSTEMS

FIELD OF THE INVENTION

The present invention relates to dense wavelength division multiplexed systems, and more particularly to gain equalization in dense wavelength division multiplexed systems.

BACKGROUND OF THE INVENTION

Fiber optic networks are becoming increasingly popular for data transmission due to their high speed, high capacity capabilities. In conventional wavelength division multiplexed (WDM) fiber optic networks, signals travel along optical fibers toward a destination node. Occasionally, the signals must be amplified by an optical amplifier, such as an Erbium Doped Fiber Amplifier (EDFA), due to attenuation of the signal strength.

The power level of digital or analog data transmissions over any given segment of the WDM network will generally vary over time. With increasing network complexity, rapid or short-term power fluctuations in signal levels are becoming of increasing concern. Such fluctuations may be caused by fluctuations in the number of data channels carried by the network and variability of the routing of the various signal channels prior to their arrival at that segment. Furthermore, both the total gain and the average gain per channel provided by an optical amplifier may depend upon the number of channels carried by the network at the point of the amplifier. This latter quantity can vary virtually instantaneously in the network depending upon network traffic conditions and routing configurations. For the above reasons, the total power level can fluctuate rapidly within a segment of a complex WDM network.

Accordingly, there is a need for a method and system for dynamic gain attenuation. The present invention addresses such a need.

SUMMARY OF THE INVENTION

A dynamic gain equalizer (DGE) includes: a mirror; an electrode; and a lever with a first end and a second end opposite to the first end, where the lever is capable of rotating about a fulcrum, where the lever rotates the first end toward the electrode when the electrode is charged such that the second end blocks a portion of a channel from reaching the mirror, where an unblocked portion of the channel is reflected by the mirror. By manipulating the charge on the electrode, the rotation of the lever is controlled, determining how much of the light is blocked by the lever. Each lever in an array can attenuate a channel or a group of channels of a composite optical signal by a different amount. The DGE provides a significant range of blockage and can be closely spaced. It provides ease in integrating channel monitoring into the DGE.

DETAILED DESCRIPTION

The present invention provides a method and system for dynamic gain attenuation. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention provides a dynamic gain equalizer (DGE) which comprises a micro-electromechanical system (MEMS) see-saw array. The array comprises a mirror and at least one lever which is capable of rotating about a fulcrum. At a first end of the lever is an electrode which, when charged, causes the lever to rotate such that the first end moves toward the electrode. When the electrode is charged, the second end of the lever, opposite to the first end, blocks a portion of a light from reaching the mirror. The unblocked part of the light is reflected from the mirror. By manipulating the amount of charge on the electrode, the amount of rotation of the lever is controlled. The amount of rotation of the lever determines how much of the light is blocked by the lever. The more light the lever blocks, the more of the light is attenuated. Each lever can attenuate a channel or a group of channels of a composite optical signal by a different amount, thus providing dynamic gain attenuation.

To more particularly describe the features of the present invention, please refer to FIGS. 1 through 5 in conjunction with the discussion below.

Figure 1:
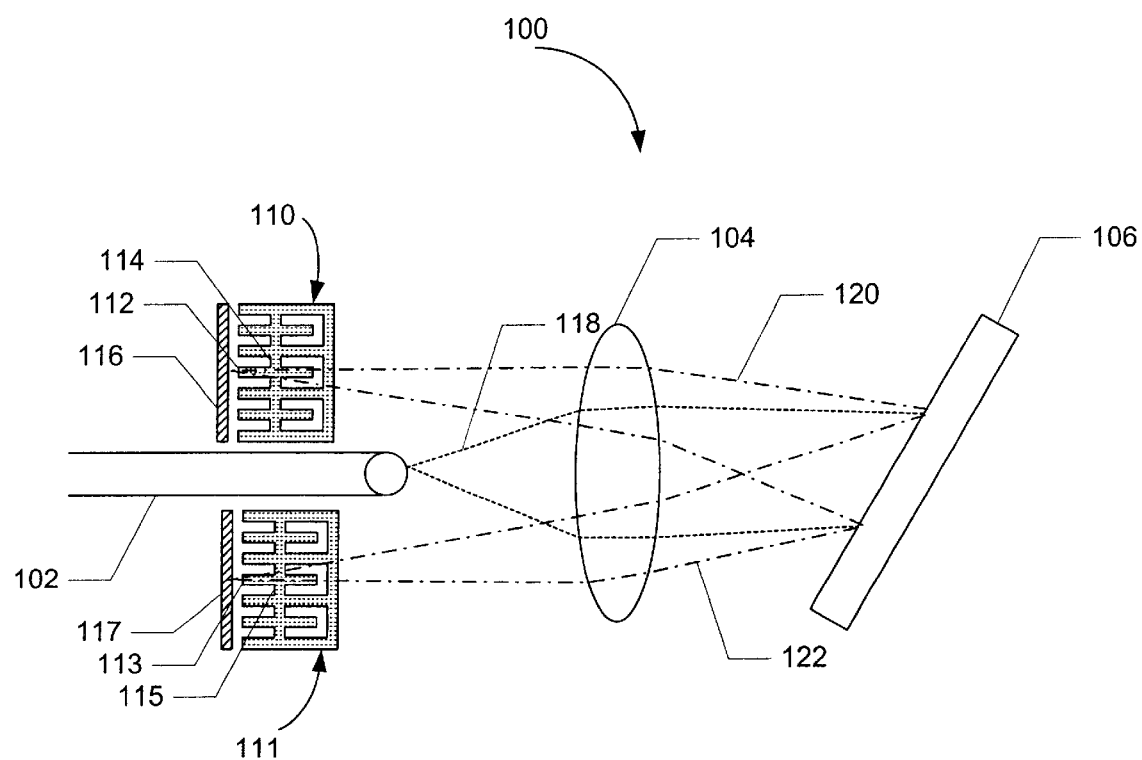
FIG. 1 illustrates a preferred embodiment of a dynamic gain equalizer in accordance with the present invention.

FIG. 1 illustrates a preferred embodiment of a dynamic gain equalizer in accordance with the present invention. The DGE 100 comprises a fiber 102 which functions both as an input and an output fiber. Separate fibers for signal input and output may be used instead. The DGE 100 also comprises a lens 104 optically coupled to the fiber 102, a diffraction grating 106 optically coupled to the lens 104 at a side opposite to the fiber 102, and at least one MEMS see-saw array 110–111 optically coupled to the lens 104 at a side opposite to the diffraction grating 106. Each array 110, 111 comprises at least one lever 112, 113 which is able to rotate about a fulcrum 114, 115. Each array 110–111 also comprises a mirror 116, 117.

A composite optical signal 118 comprising a plurality of channels enters the DGE 100 via the fiber 102. The signal 118 is collimated by the lens 104 onto the diffraction grating 106. The diffraction grating 106 reflects each wavelength of the signal 118 by a different amount, as is well known in the art. For example, channels 120 and 122 are reflected back toward the lens 104. The lens 104 focuses these channels 120, 122 onto the MEMS see-saw arrays 110 and 111, respectively. The arrays 110, 111 are placed such that its levers 112, 113 is able to block a portion of the channels 120, 122 from reaching the mirror 116, 117, respectively. To block, these levers 112, 113 are rotated about their fulcra 114, 115 in varying amounts, depending upon the amount of attenuation required by each channel. The attenuated channels 120, 122 are then reflected from the mirrors 116, 117 to the lens 104. The lens 104 focuses them onto the diffraction grating 106. The diffraction grating 106 recombines the attenuated channels 120, 122 back into a composite optical signal 118. This signal 118 is reflected through the lens 104 to the fiber 102.

Figure 2:
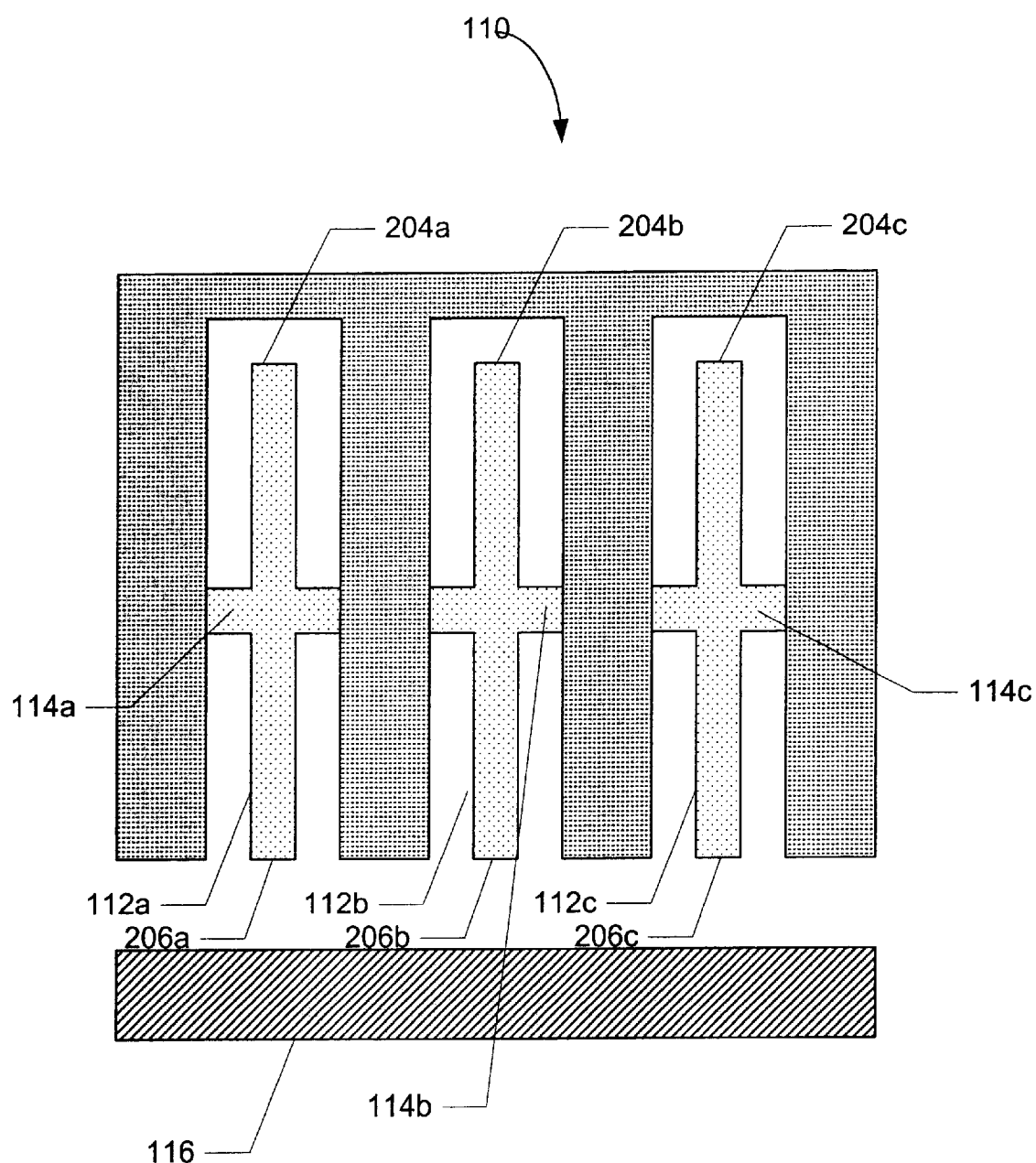
FIG. 2 illustrates, in more detail, a top view of a MEMS see-saw array utilized in the dynamic gain equalizer in accordance with the present invention.

FIG. 2 illustrates, in more detail, a top view of a MEMS see-saw array utilized in the dynamic gain equalizer in accordance with the present invention. The array 110 resides in a substrate 202. Using semiconductor fabrication techniques, the substrate 202 is etched such that at least one lever 112a, 112b, 112c is formed. Each of the levers 112a, 112b, 112c is capable of rotating about a fulcrum 114a, 114b, 114c. Each lever 112a, 112b, 112c has a first end 204a, 204b, 204c and a second end 206a, 206b, 206c. Electrodes (not shown) underneath the levers 112a, 112b, 112c may be charged such that the first ends 204a, 204b, 204c of the levers 112a, 112b, 112c are rotated toward the electrodes about their fulcra 114a, 114b, 114c. Each lever 112a, 112b, 112c may be caused to rotate in different amounts. When rotated, each lever 112a, 112b, 112c blocks a portion of a channel from reaching the mirror 116, attenuating the gain of that channel.

Figure 3:
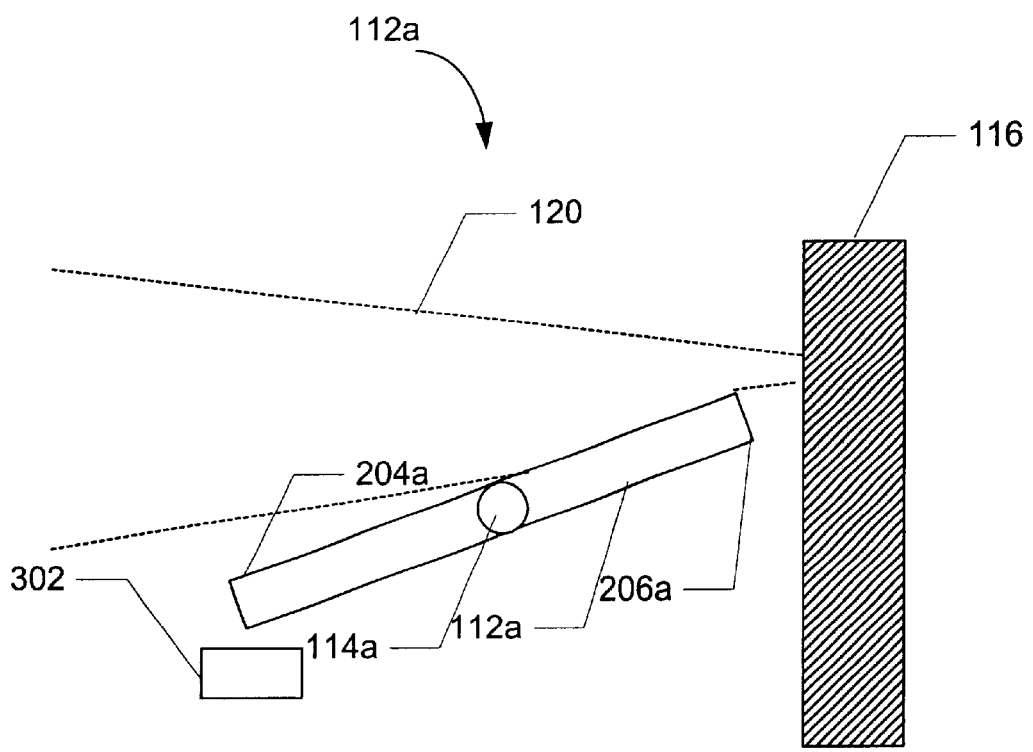
FIG. 3 illustrates, in more detail, a side view of a lever of the preferred embodiment of the MEMS see-saw array utilized in the dynamic gain equalizer in accordance with the present invention.

FIG. 3 illustrates, in more detail, a side view of a lever of the preferred embodiment of the MEMS see-saw array utilized in the dynamic gain equalizer in accordance with the present invention. The lever 112a is capable of rotating about its fulcrum 114a. At the first end 204a of the lever 112a is an electrode 302 which, when charged, causes the lever 112a to rotate such that the first end 204a moves toward the electrode 302. When the electrode 302 is not charged or is of a low charge, the lever 112a does not interfere with the channel 120. All of the channel 120 reaches the mirror 116 and is reflected. In this instance, the gain of the channel 120 is not attenuated. When the electrode 302 is charged, the second end 206a of the lever 112a, opposite to the first end 204a, blocks a portion of the channel 120 from reaching the mirror 116. The unblocked portion of the channel 120 is reflected from the mirror 116. By manipulating the amount of charge on the electrode 302, the amount of rotation of the lever 112a is controlled. The amount of rotation of the lever 112a determines how much of the channel 120 is blocked by the first end 204a of the lever 112a. The more of the channel 120 the lever 112a blocks, the more the gain of the channel 120 is attenuated.

The portion of the lever 112a between the fulcrum 114a and the second end 206a may be longer than the portion between the fulcrum 114a and the first end 204a. A greater amount of movement of the second end 206a results from each movement of the first end 204a, providing a greater range of blockage.

Figure 4:
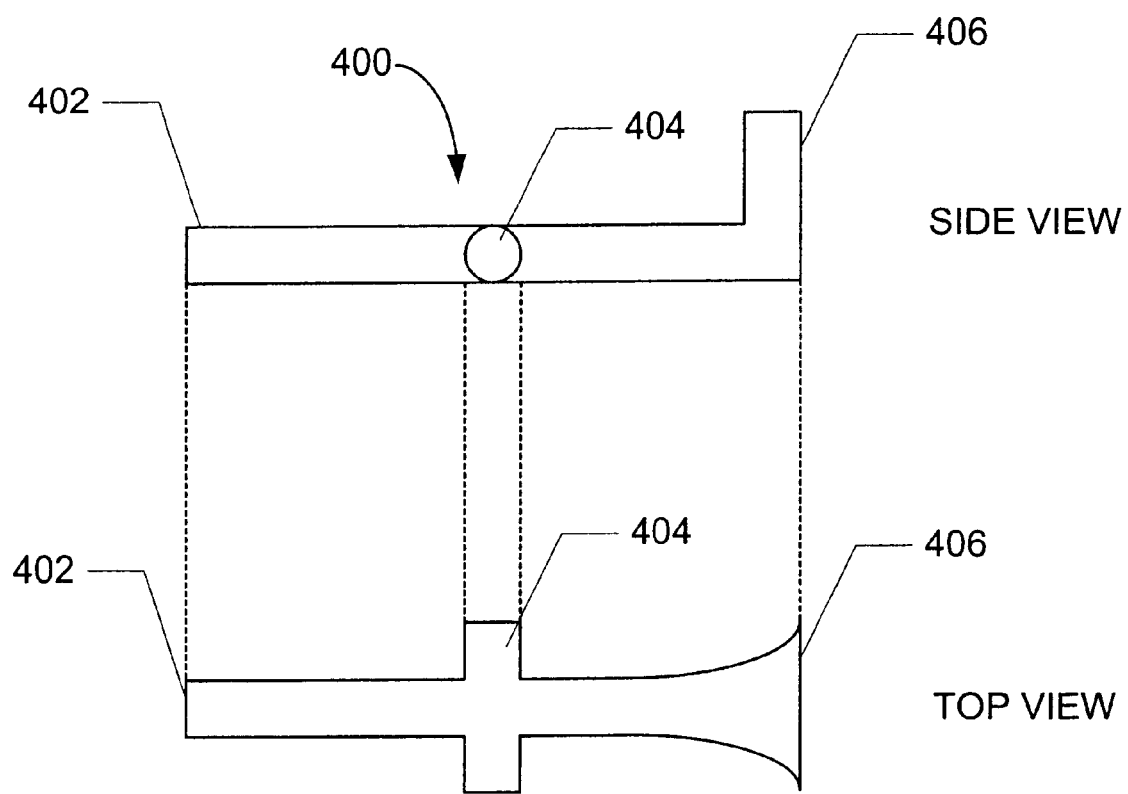
FIG. 4 illustrates an alternative shape for the lever in the MEMS see-saw array utilized in the dynamic gain equalizer in accordance with the present invention.

FIG. 4 illustrates an alternative shape for the lever in the MEMS see-saw array utilized in the dynamic gain equalizer in accordance with the present invention. The lever 400 has a first end 402 which is broader than the second end 406. Thus, when the electrode (not shown) is charged, the first end 402 of the lever 400 rotates about its fulcrum 404 toward the electrode, moving the second end 406 into the path of a light. Because the second end 406 is broader, it allows the first end 402 to be smaller than the first end 204a of the lever 112a (FIG. 3). With a smaller first end 402, its electrode (not shown) can also be smaller. This allows a plurality of the levers 400 to be more closely spaced in an array without electrical coupling. With the levers more closely spaced, the array can attenuate more closely spaced channels or has wider passband.

Figure 5:
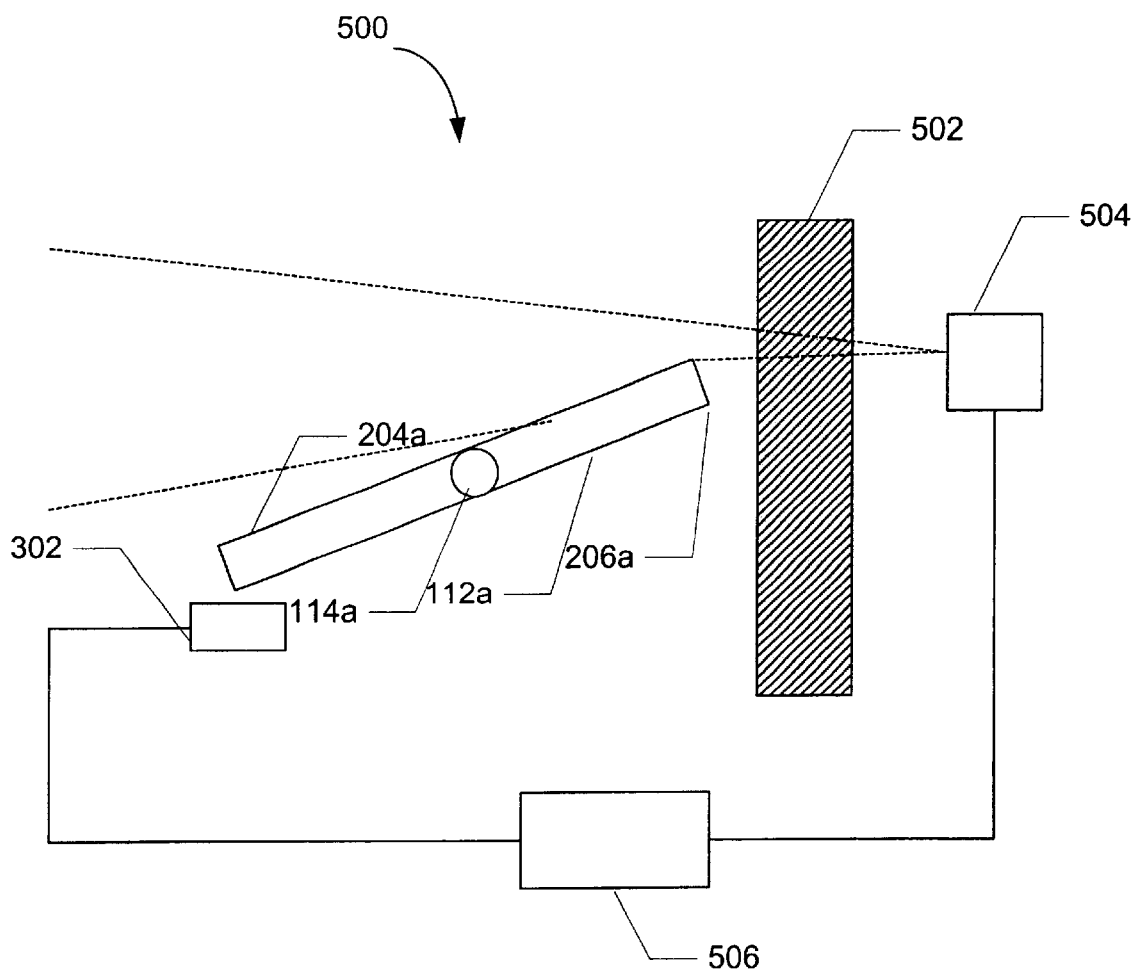
FIG. 5 illustrates a preferred embodiment of a side view of a lever of the dynamic gain equalizer with channel monitoring in accordance with the present invention.

An additional advantage of the DGE 100 in accordance with the present invention is the ease of integrating channel monitoring into the device. FIG. 5 illustrates a preferred embodiment of a side view of a lever of the dynamic gain equalizer with channel monitoring in accordance with the present invention. In addition to the components illustrated in FIG. 3, the DGE 500 has a mirror 502 which allows some of the light to leak through, a photodetector 504 at the other side of the mirror 502 from the lever 112a, and a controller 506 coupled to the photodetector 504 and the electrode 302. The photodetector 504 captures the light leakage through the mirror 502. This light leakage is then analyzed by the controller 506. The controller 506 uses this analysis to manipulate the charge on the electrode 302 to rotate the lever 112a so that a desired attenuation of a channel is obtained. In this manner, the attenuation of the channel is monitored.

A method and system for dynamic gain attenuation has been disclosed. The dynamic gain equalizer (DGE) in accordance with the present invention comprises a micro-electromechanical system (MEMS) see-saw array. The array comprises a mirror and at least one lever which is capable of rotating about a fulcrum. At a first end of the lever is an electrode which, when charged, causes the lever to rotate such that the first end moves toward the electrode. When the electrode is charged, the second end of the lever, opposite to the first end, blocks a portion of a light from reaching the mirror. The unblocked portion of the light is reflected from the mirror. By manipulating the amount of charge on the electrode, the amount of rotation of the lever is controlled. The amount of rotation of the lever determines how much of the light is blocked by the lever. The more light the lever blocks, the more the gain of the light is attenuated. Each lever can attenuate a channel of a composite optical signal by a different amount, thus providing dynamic gain attenuation. The levers in the DGE can provide a significant range of blockage and can be closely spaced. It also provides ease in integrating channel monitoring into the DGE.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A micro-electromechanical system (MEMS), comprising:
    a mirror;
    an electrode; and
    a lever with a first end and a second end opposite to the first end, wherein the lever is capable of rotating about a fulcrum, wherein the lever rotates the first end toward the electrode when the electrode is charged such that the second end blocks a portion of a channel from reaching the mirror, wherein an unblocked portion of the channel is reflected by the mirror.

2. The MEMS of claim 1, wherein a portion of the lever between the fulcrum and the second end is longer than a portion of the lever between the fulcrum and the first end.

3. The MEMS of claim 1, wherein the second end of the lever is broader than the first end of the lever.

4. The MEMS of claim 1, further comprising:
    a photodetector optically coupled to the mirror at a side opposite to the lever; and
    a controller coupled to the photodetector and the electrode.

5. A MEMS see-saw array, comprising:

a mirror;

a plurality of electrodes; and a plurality of levers, each lever corresponding to one of the plurality of electrodes, wherein each lever comprising a first end and a second end opposite to the first end, wherein each lever is capable of rotating about a fulcrum, wherein each lever rotates the first end toward its corresponding electrode when the corresponding electrode is charged such that the second end blocks a portion of a channel from reaching the mirror, wherein an unblocked portion of the channel is reflected by the mirror.

6. The array of claim 5, wherein a portion of the lever between the fulcrum and the second end is longer than a portion of the lever between the fulcrum and the first end.

7. The array of claim 5, wherein the second end of the lever is broader than the first end of the lever.

8. The array of claim 5, further comprising:

a plurality of photodetectors optically coupled to the mirror at a side opposite to the plurality of levers; and a plurality of controllers coupled to the plurality of photodetectors and the plurality of electrodes.

9. A dynamic gain equalizer (DGE), comprising:

a fiber;

a lens optically coupled to the fiber;

a diffraction grating optically coupled to the lens at a side opposite to the fiber; and at least one MEMS see-saw array optically coupled to the lens at a side opposite to the diffraction grating, comprising:

a mirror, an electrode, and a lever with a first end and a second end opposite to the first end, wherein the lever is capable of rotating about a fulcrum, wherein the lever rotates the first end toward the electrode when the electrode is charged such that the second end blocks a portion of a channel from reaching the mirror, wherein an unblocked portion of the channel is reflected by the mirror.

10. The DGE of claim 9, wherein a portion of the lever between the fulcrum and the second end is longer than a portion of the lever between the fulcrum and the first end.

11. The DGE of claim 9, wherein the second end of the lever is broader than the first end of the lever.

12. The DGE of claim 9, wherein the at least one MEMS see-saw array further comprises:

a photodetector optically coupled to the mirror at a side opposite to the lever; and a controller coupled to the photodetector and the electrode.

13. A method for dynamic gain equalization, comprising the steps of:

(a) providing a composite optical signal, the composite optical signal comprising a plurality of channels;

(b) demultiplexing the composite optical signal into the plurality of channels;

(c) directing each of the plurality of channels toward a mirror;

(d) blocking a portion of the plurality of channels from reaching the mirror by a lever having a first end and a second end opposite to the first end, wherein the lever is capable of rotating about a fulcrum, wherein the lever rotates the first end toward an electrode when the electrode is charged such that the second end blocks the portion.

14. The method of claim 13, further comprising:

(e) reflecting an unblocked portion of the plurality of channels from the mirror; and (f) multiplexing the reflected unblocked portion of the plurality of channels.

15. The method of claim 13, further comprising:

(e) detecting a light leakage through the mirror;

(f) analyzing the light leakage; and (g) controlling a charge to the electrode based on the analyzing step (f).

* * * * *